UNITED STATES PATENT OFFICE.

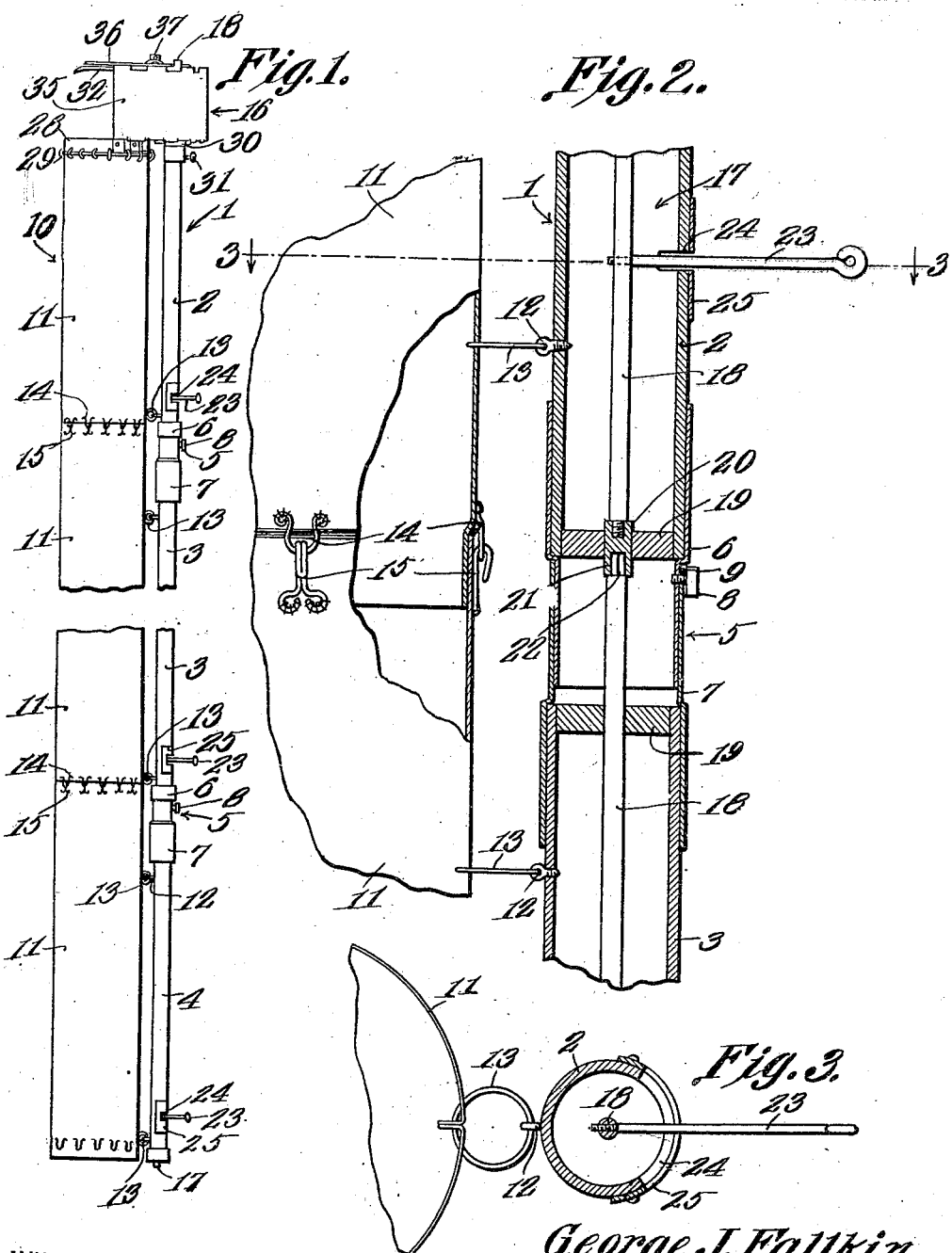

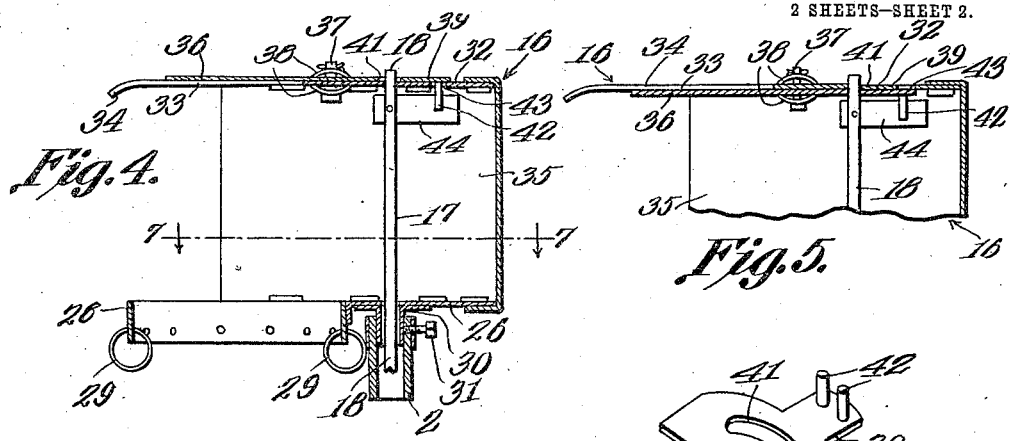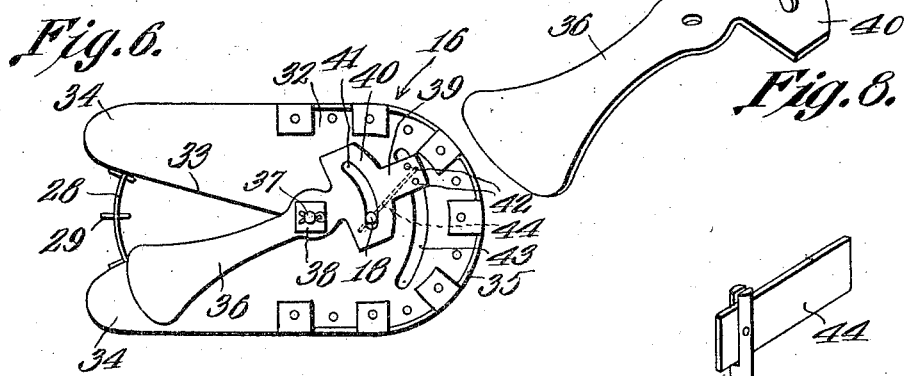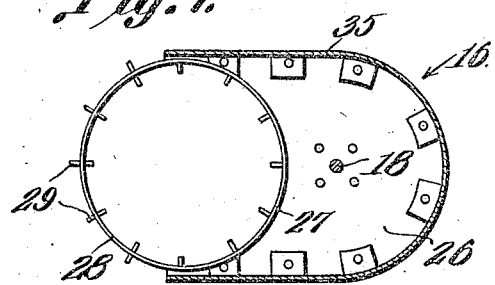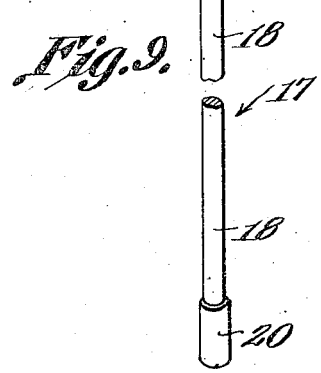

GEORGE J. FALLKIN, OF SAN JOSE, ILLINOIS.

FRUIT PICKER OR GATHERER.

1,085,728.   Specification of Letters Patent.   Patented Feb. 3, 1914.

Application filed June 20, 1913. Serial No. 774,883.

*To all whom it may concern:*

Be it known that I, GEORGE J. FALLKIN, a citizen of the United States, residing at San Jose, in the county of Mason and State of Illinois, have invented a new and useful Fruit Picker or Gatherer, of which the following is a specification.

The present invention appertains to fruit pickers or gatherers and aims to provide a novel and improved device of that character adapted to be manipulated by hand for readily plucking the fruit and gathering the same.

One of the objects of the present invention is to provide a sectional staff or pole carrying means for severing the fruit, the several sections of the pole carrying tube sections, and shaft sections, and the respective tube sections and shaft sections being attachable with each other, in order that the severing means may be actuated by the shaft, and in order that the fruit after being severed may pass down the tube or chute without being bruised.

Another object of the present invention is to provide a device of the nature indicated which may be adjusted to various lengths, according to the height of the fruit above the operator.

A further object of the present invention is to provide a novel and improved severing mechanism for plucking or detaching the fruit.

A still further object of the present invention is to provide novel and improved means for actuating the severing mechanism by means of the sectional shaft passing through the tubular sectional pole.

A still further object of the present invention is to provide a cutting or severing mechanism wherein the severing or cutting member is adjustable to accommodate fruit having short and long stems.

It is also within the scope of the present invention to improve generally the utility and construction of devices of that character to which the present invention relates.

The invention has been illustrated in its preferred embodiment in the accompanying drawings, wherein:—

Figure 1 is a side elevation of the complete apparatus, parts being broken away. Fig. 2 is an enlarged fragmental detail of the joints between the pole, shaft and conveyer sections. Fig. 3 is a sectional detail on the line 3—3 of Fig. 2. Fig. 4 is a central vertical section of the hood and severing mechanism. Fig. 5 is a fragmental detail, similar to Fig. 4, illustrating the severing member set for fruit having short stems. Fig. 6 is a plan view of the severing mechanism. Fig. 7 is a sectional view taken on the line 7—7 of Fig. 4. Fig. 8 is a perspective view of the severing member. Fig. 9 is a perspective view of a portion of the actuating shaft.

In carrying out the present invention, reference being had in detail to the drawings, there is provided a staff or pole designated generally by the numeral 1, and comprising the upper section 2, the intermediate sections 3, of which there may be any number, and the lower section 4. The pole sections are tubular, and are preferably constructed of bamboo or similar stock, both for the purpose of lightness and rigidity.

The respective pole sections are coupled or joined by means of the couplings or joints designated generally by the numeral 5. Thus, the lower ends of the respective pole sections are provided with the male tubular members 6, while the upper ends of the respective pole sections are provided with the female tubular members 7, the male members 6 being adapted to slip or telescope into the respective members 7. The male members 6 carry jam or set screws 8, while the female members 7 are provided with notches 9 adapted to receive the screws 8, so that when the screws are tightened, the heads will clamp the male and female members together. It will thus be apparent that the sections of the pole may be readily attached to and detached from each other, and that any number of intermediate sections may be provided, according to the length of pole needed.

A tube or chute, designated generally by the numeral 10, is carried by the staff or pole 1, and is preferably constructed of any suitable textile material in order to prevent injury to the fruit passing therethrough. The chute or tube 10 is constructed of a plurality of sections 11, similar to the pole sections in number. Each of the tube sections 11 is carried by the respective pole section, eye screws 12 being engaged with the pole sections, and suitable rings or loops 13 connecting the eyes of the screws 12 with the respective tube sections 11. The respective tube sections are thus loosely carried by the several pole sections.

The several tube or chute sections 11 are connected together, when the pole sections are coupled together, so as to provide a continuous tube or chute coextensive with the pole. Thus, the lower ends of the respective tube sections 11 are slipped or fitted within the upper ends of the respective tube sections, a series of eyes 14 being attached to the respective tube sections adjoining their lower ends, while a plurality of hooks 15 are attached to the respective tube sections adjoining their upper ends and are adapted to engage the eyes 14 to connect the several tube sections together. The upper ends of the respective tube sections are adapted to slip under the eyes 14, although this is not essential, but is desirable for maintaining the upper ends of the tube sections in position. The lower ends of the respective tube sections fitting within the upper ends of the adjoining sections will permit the fruit to descend or gravitate through the tube or chute without striking any obstruction which would be liable to bruise or injure the fruit.

Coming now to the severing mechanism or picker proper, which has been designated generally by the numeral 16, the same embodies a body attached to the upper end of the pole, and to which body is attached the upper end of the chute or tube, as will hereinafter appear more fully.

The severing mechanism 16 is actuated by means of a shaft 17 extending through the pole 1, the shaft 17 being divided into a plurality of sections 18, corresponding in number with the pole sections. Thus, a shaft section 18 is disposed within each pole section, bearings or bushings 19 being engaged within the respective ends of the pole sections 2 for journaling the shaft sections axially within the pole sections. The several shaft sections 18 are coupled together in a novel manner, when the pole sections are attached, and to this end, a coupling or clutch 20 is attached to the lower end of each of the respective shaft sections 18. The coupling or clutch 20 is provided with an angular or non-circular socket 21, while the upper end of the respective shaft sections 18 are provided with reduced angular or non-circular projections 22 adapted to engage within the respective sockets 21 when the sections are slipped endwise into engagement. Thus, when the pole sections are attached together, the several shaft sections will be engaged with each other, the shaft sections being rotatable with each other, but being adapted to separate by endwise movements, in order that the shaft as a whole may be properly oscillated or rocked for actuating the severing mechanism.

Each of the shaft sections 18 is provided with means for rocking or oscillating the shaft as a whole. Thus, a lever 23, has its inner end engaged or threaded through each shaft section 18 adjoining its lower end, the levers 23 working through arcuate slots 24 provided in the pole sections. Slotted plates 25 are preferably secured to the pole sections over the slots 24, to protect the portions of the pole sections adjoining the slots, which are weakened by the slots.

It will be evident that the shaft may be actuated by any of the levers 23, in order that the operation of the severing mechanism will not be affected by the number of pole sections employed, the shaft being operable from the lower end of the pole, as well as at various intervals along its length.

Referring specifically to the several mechanisms 16, the body thereof embodies a lower plate 26, preferably of sheet metal, which has its front edge curved, as at 27, a ring 28 being secured to the front curved edge 27. To the ring or annulus 28 is attached the upper end of the chute or tube, or rather the upper end of the upper tube section 11, this being readily accomplished by means of rings or eyelets 29 threaded through the respective tube section and the ring.

The body of the severing mechanism is provided with a tubular shank 30 attached to the bottom of the plate 26 and slipped into the end of the upper pole section 2, a set screw 31 being carried by the pole section 2 to engage the shank 30 for securing the severing mechanism in position.

The body or frame of the severing mechanism also includes an upper plate 32, preferably of sheet metal, provided at its forward end with a V-shaped notch 33 providing the arms 34, the upper plate, as a whole, being in the form of a fork. The sides and rear edges of the upper and lower plates 26 and 32, respectively, are secured to the edges of the U-shaped plate 35, preferably of sheet metal, which completes the body of the severing mechanism. In this manner, the upper plate 32 is rigidly attached to the lower plate 26, the forward end of the upper plate 32 extending above the ring 28 or the tube 10.

The severing member is in the form of a tapered blade 36 which has its side edges slightly curved, and having its smallest end pivoted to the plate 32 adjoining the inner or rear end of the notch 33, or between the notch and the shaft section 18, by means of a pivot pin 37 passing loosely through the blade 36 and plate 32. It is to be observed that the shaft 18 is journaled through the shank 30 and through the upper plate 32. The pivot pin 37 is removable, and has a spring washer 38 engaged on each end, the upper washer bearing against the pivotal portion of the blade 36 and the lower washer bearing against the lower face of the plate 32, to frictionally hold the blade 36 against the upper face of the plate 32, whereby the edges of the blade 36 will shear past the edges of the notch 33. The blade 36 is adapted to swing over the respective arms 34 in order that the respective edges of the blade may shear past both edges of the notch 33, in order that the blade may work both right and left handed.

The blade or severing member 36 is provided with a shank 39 projecting rearwardly from the pivotal point, and provided with an intermediate enlargement 40 having an arcuate slot 41 receiving the end of the shaft sections 18. The shank 39 is provided at its free end with a pair of depending fingers 42 passing through an arcuate slot 43 provided in the plate 32 adjoining its rear end. A flat tongue or ward 44 is secured to the shaft section 18, that is, the upper shaft section, directly below the upper plate 32, with its free portion standing between the respective fingers 42. It will be observed that the axis of the shaft section 18 and the pivotal point of the blade are eccentric with respect to one another, so that the tongue or wiper 44 will have a sliding movement between the fingers 42 as the shaft is rocked or swung to oscillate the blade 36.

The blade 36 in working upon the cutting plate 32 is adapted to sever fruit having relatively long stems, but may be reversed, so as to work below the plate 32, for severing fruit having relatively short stems. This is accomplished by loosening the body of the severing mechanism from the pole, by unscrewing the set screw 31, so that the body may be slipped upwardly. The body of the severing mechanism in being moved upwardly with respect to the pole will withdraw the upper shaft section 18 from the plate 32 and will withdraw the tongue 44 from between the fingers 42. The blade or severing member 36 may then be detached by removing the pivot pin 37, and after placing the blade 36 against the bottom of the plate 32, the pivot pin 37 may again be inserted together with the spring washers 38, in order that the lower washer will contact with the blade 36 and in order that the upper washer will contact with the upper face of the plate 32. The body of the cutting mechanism is then engaged with the pole, the upper shaft section 18 passing through the slot 41 of the blade and through the upper plate 32, and the tongue 44 again engaging between the fingers 42 as seen in Fig. 5. The oscillation of the shaft will again impart a swinging movement to the blade, the blade working under the plate 32, in order that the fruit having short stems may be readily severed from the branches.

In use, after the device has been properly assembled, the operator grasps the lower end of the pole and manipulates the same to engage the notch 33 of the cutting plate 32 over the stems of the fruit, so that the lowermost lever 23 may be swung to one side, which will correspondingly swing the blade 36 for severing the fruit. It will be noted that the fruit may be severed by both operations of the blade 36, that is from each side to the other. After the fruit is severed, the same drops into the upper end of the tube or conveyer 10 and descends or gravitates down the tube or conveyer to the lower end, from whence the fruit may be removed by hand, or from whence the fruit may be discharged directly into a basket or other receptacle. The fruit, in contacting with the sides of the chute when the pole is inclined, will be retarded in its passage down the tube or conveyer 10, in order that the fruit will not be injuriously bruised or damaged. With the assistance of the present device, an operator may readily pluck the fruit from the tree at various heights, and with ease and despatch, the present device saving labor as well as time. As above indicated, the blade or severing member 36 may be reversed for either fruit with long stems or fruit, such as peaches, having short stems. The reversing of the blade may be accomplished quickly and easily, as above described.

Particular attention is directed to the fact that the body of the severing mechanism is in the form of a hood adapted to be inserted over the fruit to be plucked, and that the tongue 44 carried by the shaft in working between the fingers 42 provides considerable leverage for actuating the blade or cutting member 36 from the shaft.

The device may be constructed of various sizes, or lengths, and may be otherwise altered in its details without departing from the spirit of the invention as defined by the appended claims. The several parts may also be readily separated and assembled for the purpose of adjusting the length of the device, or for compactly shipping or storing the device when not in use. The several elements of the parts may also be taken apart for replacing broken parts, or for other purposes.

Having thus described the invention, what is claimed is:—

1. In a device of the character described, a sectional pole, a sectional actuating shaft, the respective sections of the shaft being rotatably carried by the sections of the pole, the adjoining ends of the respective pole and shaft sections having slip joints to lock them against rotary movements with respect to one another, a severing mechanism carried by the upper end of the pole, and having means operatively connecting the shaft and severing mechanism.

2. In a device of the character described, a sectional tubular pole, a sectional shaft within the pole, the respective sections of the shaft being journaled for rotation within the sections of the pole, the respective ends of the pole and shaft sections having slip joints to lock them against rotation with respect to one another, a severing mechanism carried by the upper end of the pole and operatively connected with the shaft, and means for actuating the shaft.

3. In a device of the character described, a sectional tubular pole, a sectional shaft disposed within the pole, the sections of the shaft being journaled for rotation within the respective sections of the pole, the respective ends of the pole and shaft sections having slip joints to lock them against rotation with respect to one another, the pole sections each having an arcuate slot, a lever connected to each shaft section and working through the respective slot to oscillate the shaft, and a severing mechanism carried by the upper end of the pole and operatively connected with the shaft.

4. In a device of the character described, a pole, a hood attached thereto, the hood including an upper plate provided with a notch, a blade pivoted to the said plate to swing over the notch, the blade having a shank provided with a pair of fingers, a shaft carried by the pole, and a tongue carried by the shaft and extending between the said fingers.

5. In a device of the character described, a pole, a hood carried thereby embodying an upper plate provided with a notch, the hood and pole being detachably connected, a shaft carried by the pole and journaled through the said plate, a blade, a pivot pin pivoting the blade to the said plate intermediate the notch and shaft, the blade being reversible to work against both faces of the plate, the blade having a shank provided with an arcuate slot receiving the shaft, the said shank having a pair of depending fingers, the said plate being provided with an arcuate slot to receive the fingers, and a tongue secured to the shaft and standing between the two fingers.

In testimony that I claim the foregoing as my own, I have hereto affixed my signature in the presence of two witnesses.

GEORGE J. FALLKIN.

Witnesses:
 JOHN B. NORRIS,
 CYRUS HOPEWELL.